United States Patent
Chang et al.

(10) Patent No.: US 9,176,631 B2
(45) Date of Patent: Nov. 3, 2015

(54) TOUCH-AND-PLAY INPUT DEVICE AND OPERATING METHOD THEREOF

(71) Applicant: Wistron Corporation, New Taipei (TW)

(72) Inventors: Chih-Hsiung Chang, New Taipei (TW); You-Xin Liu, New Taipei (TW); Yi-Shu Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 137 days.

(21) Appl. No.: 13/735,042

(22) Filed: Jan. 7, 2013

(65) Prior Publication Data

US 2013/0342499 A1     Dec. 26, 2013

(30) Foreign Application Priority Data

Jun. 26, 2012   (TW) .............................. 101122843 A

(51) Int. Cl.
*G06F 3/045*      (2006.01)
*G06F 3/044*      (2006.01)

(52) U.S. Cl.
CPC ...................................... *G06F 3/044* (2013.01)

(58) Field of Classification Search
CPC ......... G06F 3/044; G06F 3/0414; G06F 3/02; G06F 3/0312; G06F 3/03543; G06F 3/03548; G06F 3/0362; G06F 3/04847
USPC ............... 345/173–174, 184, 156; 178/18.01, 178/18.03, 18.06, 18.07
See application file for complete search history.

(56) References Cited

U.S. PATENT DOCUMENTS

| | | | |
|---|---|---|---|
| 4,878,107 A | 10/1989 | Hopper | |
| 4,974,454 A | 12/1990 | Wolfer et al. | |
| 6,492,979 B1 | 12/2002 | Kent et al. | |
| 8,310,351 B2 * | 11/2012 | Krahenbuhl et al. | 340/407.2 |
| 8,462,133 B2 * | 6/2013 | Lynch et al. | 345/174 |
| 8,994,666 B2 * | 3/2015 | Karpfinger | 345/173 |
| 2001/0032674 A1 | 10/2001 | Brunet et al. | |
| 2006/0256090 A1 * | 11/2006 | Huppi | 345/173 |
| 2007/0248892 A1 | 10/2007 | Rangelow | |
| 2009/0009471 A1 | 1/2009 | Yamamoto et al. | |
| 2009/0295722 A1 | 12/2009 | Yamamoto | |
| 2009/0309830 A1 | 12/2009 | Yamamoto et al. | |
| 2010/0001953 A1 | 1/2010 | Yamamoto et al. | |
| 2010/0103096 A1 | 4/2010 | Yamamoto et al. | |
| 2010/0169824 A1 | 7/2010 | Sawai et al. | |

(Continued)

OTHER PUBLICATIONS

"Office Action of Taiwan Counterpart Application", issued on Dec. 9, 2014, p. 1-p. 6.

(Continued)

*Primary Examiner* — Rodney Amadiz
(74) *Attorney, Agent, or Firm* — Jianq Chyun IP Office

(57) ABSTRACT

A touch-and-play input device coupled to an electronic device having a touch unit is provided. The touch-and-play input device comprises an input unit, a attaching unit and at least one conductive unit. The input unit generates an input signal. The attaching unit comprises an attaching surface. The conductive units are configured on the attaching surface of the attaching unit and are electrically connected to the input unit. The attaching unit attaches a portion of the touch unit of the electronic device through the attaching surface so that the conductive units touch a portion of the touch unit. Further, the input signal is input into the electronic device through the conductive units and the touch unit.

12 Claims, 4 Drawing Sheets

(56) References Cited

U.S. PATENT DOCUMENTS

| | | | |
|---|---|---|---|
| 2010/0265175 A1 | 10/2010 | Kabasawa et al. | |
| 2010/0295810 A1 | 11/2010 | Nagata et al. | |
| 2010/0321291 A1 | 12/2010 | Kabasawa et al. | |
| 2011/0193818 A1* | 8/2011 | Chen et al. | 345/174 |
| 2011/0199289 A1 | 8/2011 | Yamamoto et al. | |
| 2011/0219635 A1 | 9/2011 | Rangelow | |
| 2011/0227841 A1* | 9/2011 | Argiro | 345/173 |
| 2011/0248947 A1* | 10/2011 | Krahenbuhl et al. | 345/174 |
| 2011/0298721 A1* | 12/2011 | Eldridge | 345/173 |
| 2012/0120019 A1* | 5/2012 | Choi et al. | 345/174 |

OTHER PUBLICATIONS

"Office Action of Taiwan Counterpart Application" with partial English translation, issued on May 11, 2015, p. 1-p. 14.

* cited by examiner

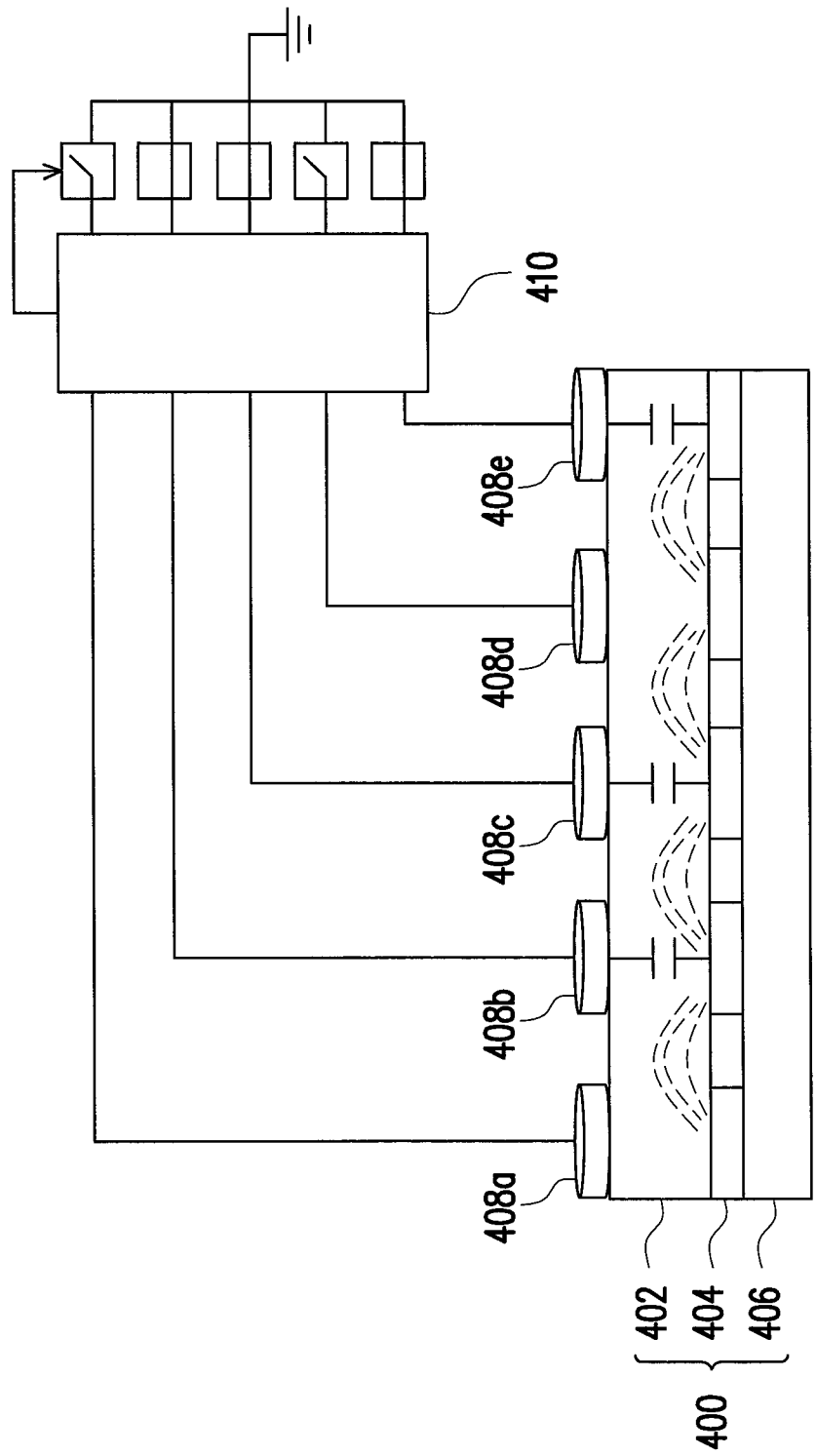

TOUCH-AND-PLAY INPUT DEVICE AND OPERATING METHOD THEREOF

CROSS-REFERENCE TO RELATED APPLICATION

This application claims the priority benefit of Taiwan application serial no. 101122843, filed on Jun. 26, 2012. The entirety of the above-mentioned patent application is hereby incorporated by reference herein and made a part of this specification.

BACKGROUND OF THE INVENTION

1. Field of Invention

The present disclosure relates to an input device and an operating method thereof. More particularly, the present disclosure relates to a touch-and-play input device and an operating method thereof.

2. Description of Related Art

Along with the advancement and widespread of information technology, wireless mobile communication, and information appliances, the conventional input devices (such as keyboards and mice) of many information products have been gradually replaced by touch device in order to achieve a more intuitional operation environment. The touch device comprises the display device, the touch panel with the displaying ability and the substrate having the touch pad with the touch function as the input device.

The touch devices are classified as resistive type, capacitor type, sound acoustic wave type, optical type and so on. The capacitor-type touch device utilizes the capacitive sensor. When the finger touches the screen, the continuous electric current passes through the finger and the screen and the sensor can accurately position the coordinates of the current touch point through the electric current to form a capacitive field. When the finger moves to change the electric current, the voltages of the four corners are changed accordingly. Therefore, the sensor calculates the moving path of the finger by utilizing the changes of the voltages and outputs the accurate coordinates to the computer. The current capacitor-type multipoint touch device becomes the main technology in the field and the mobile phone and the tablet personal computer are all equipped with the capacitor-type touch devices.

However, the problem derived from the use of the touch device is the decreasing of the physical button. Currently, in the practical uses of the electronic products, there are many demands for the physical buttons and other various types of input device. The current method for solving the aforementioned problem is to use the physical connector to connect to the physical button or to use the blue-tooth transmission to control the electronic device. Nevertheless, the physical connector must be taken into account at the beginning of the design of the main device. Further, the specification of the physical connector is complex and can not be commonly used by various main devices. Moreover, if the main device needs to compromised with the peripheral devices, the design of the main device becomes difficult. For instance, if the wireless transmission is applied, the power consumption is increased and the peripheral devices can not be used at the same time. Also, the cost is increased.

SUMMARY OF THE INVENTION

The disclosure provides a touch-and-play input device capable of being externally connected to an electronic device through the way of attaching or adsorbing and without using any physical connector and having advantages of being commonly applied on various software or hardware, low power consumption and low cost.

The disclosure provides an operating method for controlling the conducting status of the conductive units of the touch-and-play input device so that the touch unit is induced to generate induced signal to achieve the goal of triggering a touch event by using a physical button or a physical object The disclosure provides a touch-and-play input device externally connected to an electronic device having a touch unit. The touch-and-play input device comprises an input unit, an attaching unit and at least one conductive unit. The input unit generates an input signal. The attaching unit has an attaching surface. The conductive units are configured on the attaching surface of the attaching unit and electrically connected to the input unit. The attaching unit attaches a portion of the touch unit of the electronic device through the attaching surface so that the conductive units touch a portion of the touch unit and the input signal is inputted into the electronic device through the touch unit.

According to one embodiment of the present disclosure, the touch-and-play input device further comprises a control unit electrically connected to the conductive units so as to control the conductive units to transmit the input signal to the electronic device.

According to one embodiment of the present disclosure, the control unit controls the conductive units to change a static electric field distribution of the touch unit so that the touch unit generates an induced signal corresponding to the input signal.

According to one embodiment of the present disclosure, a touch point number of the touch unit is larger than or equal to a conductive unit number of the conductive units.

According to one embodiment of the present disclosure, the touch unit includes a capacitive touch panel.

According to one embodiment of the present disclosure, each of the conductive units includes a conductive adhesive or a conductive material.

According to one embodiment of the present disclosure, the input unit includes a physical keyboard, a mouse, a physical musical instrument or any physical input unit.

The disclosure also provides an operating method for an electronic device having a touch unit, wherein an input unit is externally connected to the electronic device through at least one of the conductive units which is connected a portion of the touch unit. The method comprises generating an input signal by the input unit. According to the input signal, the conductive units touching the portion of the touch unit is controlled so that the touch unit generates an induced signal corresponding to the input signal. According to the induced signal, the electronic device performs an operation corresponding to the induced signal.

According to one embodiment of the present disclosure, the step the touch unit generates the induced signal according to the input signal further comprises controlling the conductive units to change a static electric field distribution of the touch unit touched by the conductive units so that the touch unit generates the induced signal corresponding to the input signal.

According to one embodiment of the present disclosure, a touch point number of the touch unit is larger than or equal to a conductive unit number of the conductive units.

According to one embodiment of the present disclosure, the touch unit includes a capacitive touch panel.

According to one embodiment of the present disclosure, each of the conductive units includes a conductive adhesive or a conductive material.

According to one embodiment of the present disclosure, the input unit includes a physical keyboard, a mouse, a physical musical instrument or any physical input unit.

In the present disclosure, by using the attaching unit (such as the attaching plate, the attaching film, the adsorbing plate or the adsorbing film) having the conductive units (elements) to attach on/adsorb a portion of the touch unit of the electronic device, the input device connected to the attaching unit is externally connected to the electronic device. Since the conductive units touch a portion of the touch unit while the attaching unit attaches on/adsorbs the portion of the touch unit, various touch behaviors of the input device (such as the finger or the stylus) directly on the touch unit can be simulated by controlling the conducting status of the conductive units while the conductive units touch the touch unit. Therefore, the goal of using the physical button or the physical object to trigger a touch-control event (touch behavior) can be achieved. Further, the touch-and-play input device possesses the advantages of being commonly applied on different operating systems and hardware, low power consumption, no physical connector and low cost.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 3B is a schematic cross-sectional view showing the conductive units touching the touch unit according to another embodiment of the present disclosure.

DESCRIPTION OF THE PREFERRED EMBODIMENTS

In the following embodiments, a touch-and-play input device and an operating method for an electronic device are illustrated. The so-called touch-and-play input device is the input device which can attach on or adsorb a portion of the touch unit of the electronic device through the attaching unit having conductive units (elements) and without using any physical connector so that the input device connected to the attaching unit can be connected to the electronic device. The attaching unit can be, for example, the attaching plate, the attaching film, the adsorbing plate or the adsorbing film. Since the conductive units touch a portion of the touch unit while the attaching unit attaches to/adsorbs the portion of the touch unit, various touch behaviors of the input device (such as the finger or the stylus) directly on the touch unit can be simulated by controlling the conducting status of the conductive units while the conductive units touch the touch unit. Therefore, the goal of using the physical button or the physical object to trigger a touch-control event (touch behavior) can be achieved. The electrical connection between the external input device and the electronic device is accomplished and the signal transmission between the external input device and the electronic device can be performed only if the conductive units on the attaching unit touch any part of the touch unit of the electronic device. Thus, the external input device connected to the electronic device in the way of the attaching connection possesses the character of touch-and-play and the external input device of the present disclosure is regarded as the touch-and-play input device.

Figure 1:
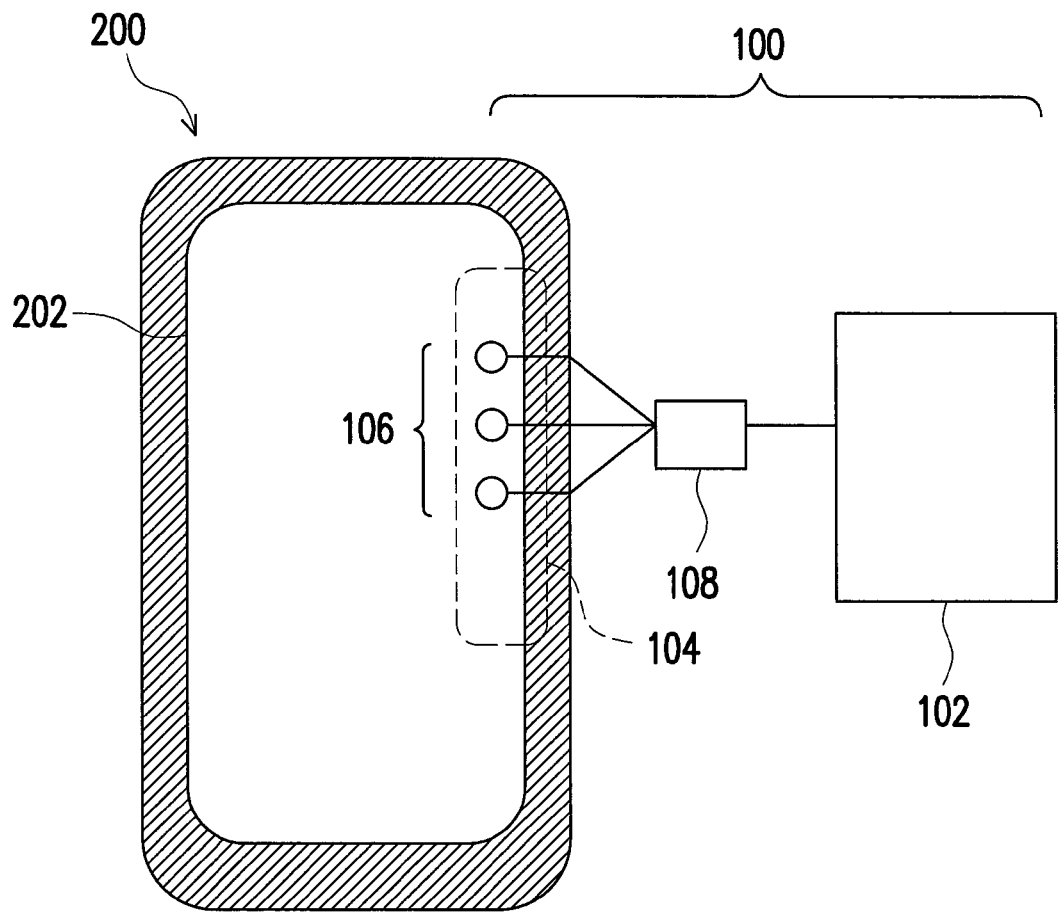
FIG. 1 is a schematic diagram showing a touch-and-play input device according to one embodiment of the present disclosure.

FIG. 1 is a schematic diagram showing a touch-and-play input device according to one embodiment of the present disclosure. As shown in FIG. 1, a touch-and-play input device 100 of the present embodiment is externally connected to an electronic device 200. The electronic device 200 has a touch unit 202. The electronic device 200 can be, for example, a personal computer, a notebook, a tablet personal computer (tablet PC), a smart phone, personal digital assistant (PDA) or any portable device equipped with the touch unit 202. The aforementioned touch unit 202 can be, for example, a touch display formed by integrating the touch panel and the display. More specifically, the touch unit 202 can be, for example, a capacitive touch panel.

The touch-and-play input device comprises an input unit 102, an attaching unit 104 and at least one conductive unit 106. The input unit 102 can be, for example, a physical button, a physical keyboard or a physical object capable of generating input signal (the physical object includes a mouse, a physical musical instrument or any physical input unit). The user operates the input device 102 to generate an input signal.

Figure 1A:
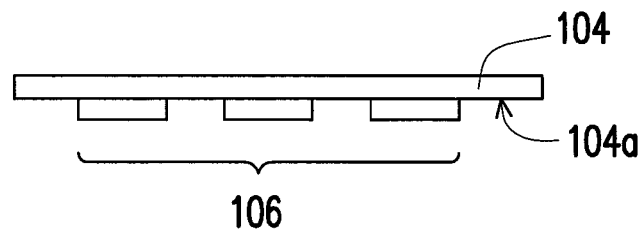
FIG. 1A is a schematic cross-sectional view of an attaching unit according to one embodiment of the present disclosure.

FIG. 1A is a schematic cross-sectional view of an attaching unit according to one embodiment of the present disclosure. As shown in FIG. 1 and FIG. 1A, the attaching unit 104 has an attaching surface 104a. The attaching unit 104 can be, for example, the thin plate or thin film having the attaching surface 104a coated with adhesive material, the thin plate or thin film having the attaching surface 104a itself made of adhesive material, the thin plate or thin film having the attaching surface 104a with the physical adsorbability or the thin plate or thin film having the attaching surface 104a with the structure having the adsorbability.

Moreover, the conductive units 106 are configured on the attaching surface 104a of the attaching unit 104 and are electrically connected to the input unit 102. The attaching unit 104 attaches a portion of the touch unit 202 of the electronic device 200 through the attaching surface 104a. Therefore, the conductive units 106 touch a portion of the touch unit 202 and the input signal generated by the input signal 102 is inputted into the electronic device through the touch unit 202 by using the conductive units 106 to suck the charges on the touch unit 202. The conductive units 106 can be, for example, a conductive adhesive or a conductive material. It should be noticed that a touch point number of the touch unit 202, according to the standards of the touch unit 202, is larger than or equal to a conductive unit number of the conductive units 106. For instance, when the touch unit 202 is a five-point touch unit, the conductive unit number of the conductive units 106 is about 1~5.

In addition, the touch-and-play input device 100 of the present embodiment further comprises a control unit 108. The control unit can be, for example, a control circuit electrically connected to the conductive units 106 so as to control the conductive units 106 to transmit the input signal to the electronic device. In one embodiment, the control unit 108 controls the conductive units 106 to change the static electric field distribution of the touch unit 202 so that the touch unit 202 generates an induced signal corresponding to the input signal. More specifically, the control unit 108, according to the input signal, controls the conducting status of the conductive units 106 while the conductive units touch the touch unit 202 so as to change the static electric field distribution of the touch unit 202 and the touch unit 202 senses the change of the static electric field and generates the induced signal corresponding to the input signal.

Figure 2:
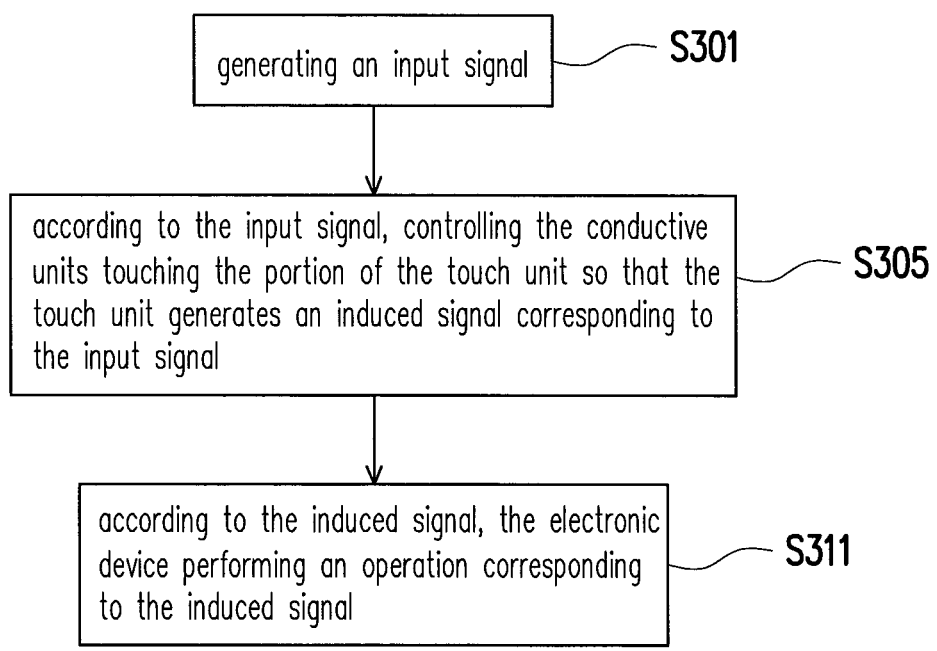
FIG. 2 is a flow chart showing an operating method according to one embodiment of the present disclosure.

FIG. 2 is a flow chart showing an operating method according to one embodiment of the present disclosure. As shown in FIG. 1 and FIG. 2, the operating method of the present embodiment is adopted by an electronic device 200 having a touch unit 202 and the input unit 102 is externally connected to the electronic device 200 through at least one conductive unit 106 touching a portion of the touch unit 202.

In the step S301, the input unit 102 generates an input signal. Then, in the step S305, according to the input signal, the control unit 108 controls the conductive units 106 touching the portion of the touch unit 202 so that the touch unit 202 generates an induced signal corresponding to the input signal. In one embodiment, according to the input signal, the step of the touch unit 202 generating induced signal further comprises controlling the conductive units 106 to change a static electric field distribution of the touch unit 202 so that the touch unit 202 generates the induced signal corresponding to the input signal.

Thereafter, in the step S311, according to the induced signal, the electronic device 200 performs an operation corresponding to the induced signal.

In the following paragraphs, several embodiments are used to describe that the conductive units are fixed and attach to the touch unit of the electronic device and the various touching behaviors of the input device (such as the finger or the stylus) directly on the touch unit can be simulated by controlling the conducting status of the conductive units.

Figure 3A:
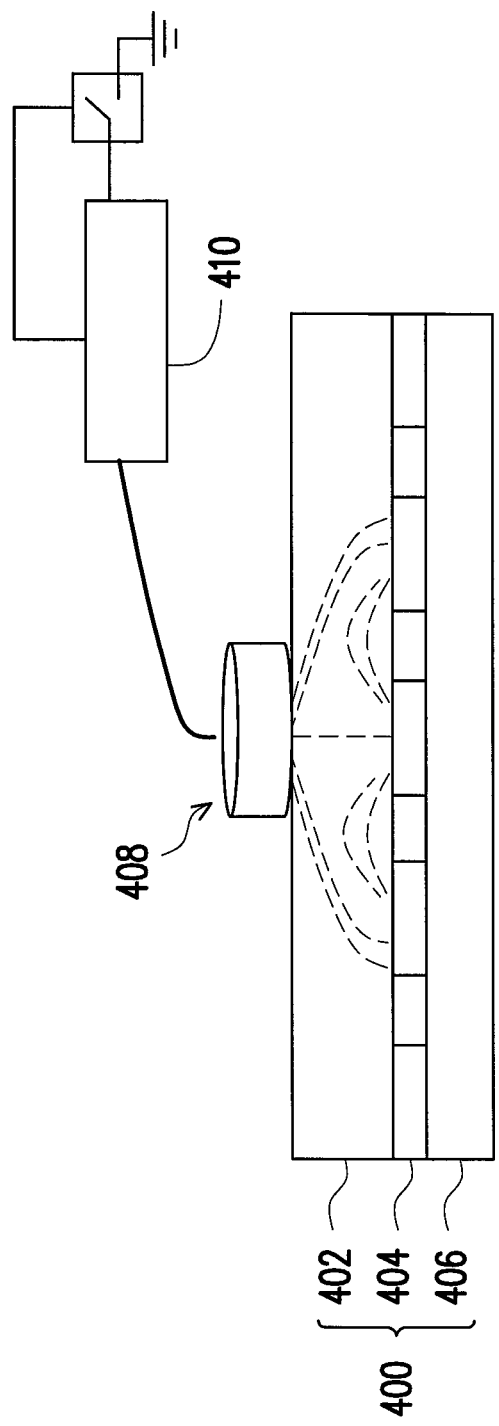
FIG. 3A is a schematic cross-sectional view showing the conductive units touching the touch unit according to one embodiment of the present disclosure.

FIG. 3A is a schematic cross-sectional view showing the conductive units touching the touch unit according to one embodiment of the present disclosure. As shown in FIG. 3A, the touch unit 400 of the present embodiment comprises a transparent electrode 402, a touch sensor 404 and a substrate 406 which are sequentially stacked on one another form the top to the bottom. When the conductive unit 406 of the touch-and-play input device is a single conductive unit, the control unit 410 makes the conductive unit 408 to be electrically conducted so that the charges accumulated on the transparent electrode 402 are conducted to the ground. Accordingly, the static electric field distribution of the touch unit 400 is changed and the touch unit 400 is induced to generate the induced signal. For instance, the control unit 410 controls the switching valve of the single conductive unit 408, according to the input signal (such as the binary code or the Morse code) generated by the input unit, to generate high level pulse and low level pulse so that the static electric field distribution of the transparent electrode 402 is changed with the high level pulse and the low level pulse. Therefore, the touch unit 400 is induced to generate the induced signal corresponding to the input signal.

FIG. 3B is a schematic cross-sectional view showing the conductive units touching the touch unit according to another embodiment of the present disclosure. As shown in FIG. 3B, the touch unit 400 of the present embodiment comprises a transparent electrode 402, a touch sensor 404 and a substrate 406 which are sequentially stack on one another from the top to the bottom. When the conductive unit number of the touch-and-play input device is larger than one (that is, in the present disclosure, the conductive unit number of the conductive units of the present embodiment is five and the conductive units are labeled 408a, 408b, 408c, 408d and 408e), the control unit 410 controls the switching valves of the conductive units 408a, 408b, 408c, 408d and 408e at the same time according to the input signal in the foul' of combination code. Therefore, the static electric field distribution of the transparent electrode 402 is changed and the touch unit 400 is induced to generate the induced signal corresponding to the input signal. In the present embodiment, if the input signal is 01101 which is a five-digit binary code, the control unit 410 controls the conductive units 408b, 408c and 408e, according to the input signal, to change the static electric field distribution on the transparent electrode 402. Therefore, the touch unit 400 is induced to generate the induced signal corresponding to the input signal and the goal of transmitting the input signal to the electronic device can be achieved. By using the multipoint touch mechanism, the press signals of different locations can be transmitted at the same time so as to decrease the datumization of the press data.

Moreover, when receiving the aforementioned induced signal, the electronic device performs the operation corresponding to the induced signal according to the content of the induced signal.

Altogether, in the present disclosure, by using the attaching unit (such as the attaching plate, the attaching film, the adsorbing plate or the adsorbing film) having the conductive units (elements) to attach on/adsorb a portion of the touch unit of the electronic device, the input device connected to the attaching unit is externally connected to the electronic device. Since the conductive units touch a portion of the touch unit while the attaching unit attaches on/adsorbs the portion of the touch unit, various touch behaviors of the input device (such as the finger or the stylus) directly on the touch unit can be simulated by controlling the conducting status of the conductive units while the conductive units touch the touch unit. Therefore, the goal of using the physical button or the physical object to trigger a touch-control event (touch behavior) can be achieved. Further, the touch-and-play input device possesses the advantages of being commonly applied on different operating systems and hardware, low power consumption, no physical connector and low cost.

It will be apparent to those skilled in the art that various modifications and variations can be made to the structure of the present disclosure without departing from the scope or spirit of the disclosure. In view of the foregoing descriptions, it is intended that the present disclosure covers modifications and variations of this disclosure if they fall within the scope of the following claims and their equivalents.

What is claimed is:

1. A touch-and-play input device coupled to an electronic device having a touch unit, the touch-and-play input device comprising:

an input unit generating an input signal;
an attaching unit having an attaching surface;
at least a conductive unit configured on the attaching surface of the attaching unit and electrically connected to the input unit, wherein the attaching unit attaches a portion of the touch unit of the electronic device through the attaching surface so that the at least one conductive unit touches a portion of the touch unit and the input signal is inputted into the electronic device through the touch unit; and
a control unit electrically connected to the at least one conductive unit, conducting the at least one conductive unit for providing a conductive path to ground for generating a plurality of pulses with different levels according to the input signal, and controlling the at least one conductive unit to transmit the input signal to the electronic device by the plurality of pulses with different levels, wherein the control unit controls the at least one conductive unit to change a static electric field distribution of the touch unit in response to the plurality of pulses applied to the at least one conductive unit so that the touch unit generates an induced signal corresponding to the input signal.

2. The touch-and-play input device of claim 1, wherein a touch point number of the touch unit is larger than or equal to a conductive unit number of the at least one conductive unit.

3. The touch-and-play input device of claim 1, wherein the touch unit includes a capacitive touch panel.

4. The touch-and-play input device of claim 1, wherein each of the at least one conductive unit includes a conductive adhesive or a conductive material.

5. The touch-and-play input device of claim 1, wherein the input unit includes a physical keyboard, a mouse, a physical musical instrument or any physical input unit.

6. An operating method for an electronic device having a touch unit, wherein an input unit is externally connected to the electronic device through at least one conductive unit which is connected a portion of the touch unit, the method comprising:
 the input unit generating an input signal;
 according to the input signal, conducting the at least one conductive unit for providing a conductive path to ground for generating a plurality of pulses with different levels and controlling the at least one conductive unit touching the portion of the touch unit by the plurality of pulses with different levels so that the touch unit generates an induced signal in response to the plurality of pulses applied to the at least one conductive unit, wherein controlling the at least one conductive unit to change a static electric field distribution of the touch unit touched by the at least one conductive unit so that the touch unit generates the induced signal corresponding to the input signal; and
 according to the induced signal, the electronic device performing an operation corresponding to the induced signal.

7. The operating method of claim 6, wherein a touch point number of the touch unit is larger than or equal to a conductive unit number of the at least one conductive unit.

8. The operating method of claim 6, wherein the touch unit includes a capacitive touch panel.

9. The operating method of claim 6, wherein each of the at least one conductive unit includes a conductive adhesive or a conductive material.

10. The operating method of claim 6, wherein the input unit includes a physical keyboard, a mouse, a physical musical instrument or any physical input unit.

11. A touch-and-play input device coupled to an electronic device having a touch unit, the touch-and-play input device comprising:
 an input unit generating an input signal with a multiple-digit binary code;
 an attaching unit having an attaching surface;
 a plurality of conductive units configured on the attaching surface of the attaching unit and electrically connected to the input unit, wherein the attaching unit attaches a portion of the touch unit of the electronic device through the attaching surface so that the plurality of conductive units touch a portion of the touch unit and the input signal is inputted into the electronic device through the touch unit; and
 a control unit, electrically connected to the plurality of conductive units, conducting at least one of the plurality of conductive units for providing at least one conductive path to ground according to the multiple-digit binary code of the input signal and controlling the plurality of conductive units at the same time to transmit the input signal with the multiple-digit binary code to the electronic device, wherein the control unit controls the plurality of conductive units to change a static electric field distribution of the touch unit in response to the multiple-digit binary code of the input signal and the at least one of the plurality of conductive units conducted by the control unit so that each of the touch units generate an induced signal corresponding to the multiple-digit binary code of the input signal.

12. An operating method for an electronic device having a touch unit, wherein an input unit is externally connected to the electronic device through a plurality of conductive units which are connected to a portion of the touch unit, the method comprising:
 the input unit generating an input signal with a multiple-digit binary code;
 conducting at least one of the plurality of conductive units for providing at least one conductive path to ground according to the multiple-digit binary code of the input signal;
 controlling the plurality of conductive units touching the portion of the touch unit at the same time according to the multiple-digit binary code of the input signal, so that the touch unit generates an induced signal corresponding to the multiple-digit binary code of the input signal, wherein controlling the conductive units at the same time to change a static electric field distribution of the touch unit touched by the plurality of conductive units in response to the multiple-digit binary code of the input signal and the at least one of the plurality of conductive units conducted by the control unit so that the touch unit generates the induced signal corresponding to the multiple-digit binary code of the input signal; and
 according to the induced signal, the electronic device performing an operation corresponding to the induced signal.

\* \* \* \* \*